W. M. NEILL.

Soldering Rod.

No. 128,809. Patented July 9, 1872.

Witnesses:
P. C. Dieterich
N. O. Graham

Inventor:
Wm. M. Neill
per
Attorneys.

No. 128,809

UNITED STATES PATENT OFFICE.

WILLIAM M. NEILL, OF BRIDGEPORT, CONNECTICUT, ASSIGNOR TO HIMSELF AND S. D. ROBERTS, OF NEW YORK, N. Y.

IMPROVEMENT IN SOLDERING-RODS.

Specification forming part of Letters Patent No. 128,809, dated July 9, 1872.

Specification describing a new and useful Improvement in Soldering-Rod, invented by WILLIAM M. NEILL, of Bridgeport, in the county of Fairfield and State of Connecticut.

This invention relates to soldering tin-roofs more especially, but is adapted to other purposes. Tin-roofs are generally soldered with resin and solder separate. The plates of tin are fitted and laid, and the joints are made ready for soldering, and then the resin in the form of powder is sprinkled over the surface where the joints are to be made and then the solder is applied. There are objections to this mode, as the resin frequently becomes displaced by jarring, or the wind blows the dry powder away. In windy weather it is almost impossible to solder a roof.

My invention consists in a combination soldering-rod, composed of a tube or rod of solder filled or combined with resin, the tube being of suitable size to furnish, when melted by the soldering-iron, the requisite quantity of solder, and the bore of the tube to furnish the requisite quantity of resin, the two being applied at one and the same time.

The accompanying drawing illustrates my invention.

Figure 1:
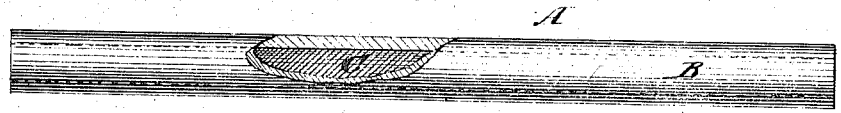
Figure 2:

Figure 1 shows a solder-tube filled with resin, partly in section. Figure 2 is a cross-section of an open V-shaped rod.

Similar letters of reference indicate corresponding parts.

A is the combination soldering-rod. B represents the metal, and C the resin. Instead of an entire tube, a half tube may be employed for holding the resin, or an angular or V-shaped rod of solder, as seen in Fig. 2; or a rod or plate of solder of any shape, with which the required quantity of resin is combined, whereby the resin and the solder may be deposited simultaneously by the soldering-iron or "copper."

I do not therefore confine myself to any precise form, but to any combination of a soldering-rod and resin which will allow the two to be used simultaneously or as they are required for soldering.

Having thus described my invention, I claim as new and desire to secure by Letters Patent—

A tube or rod of solder with which resin is combined in such a manner as will allow the resin and solder to be melted and used at the same time.

WM. M. NEILL.

Witnesses:
T. B. MOSHER,
GEO. W. MABEE.